US010382210B2

(12) United States Patent
Schaap et al.

(10) Patent No.: US 10,382,210 B2
(45) Date of Patent: Aug. 13, 2019

(54) SECURE DEVICE PAIRING

(71) Applicant: Apple Inc., Cupertino, CA (US)

(72) Inventors: Tristan F. Schaap, San Francisco, CA (US); Conrad Sauerwald, Mountain View, CA (US); Craig A. Marciniak, Cupertino, CA (US); Jerrold V. Hauck, Windermere, FL (US); Zachary F. Papilion, Cupertino, CA (US); Jeffrey Lee, Rockledge, FL (US)

(73) Assignee: Apple Inc., Cupertino, CA (US)

( * ) Notice: Subject to any disclaimer, the term of this patent is extended or adjusted under 35 U.S.C. 154(b) by 199 days.

(21) Appl. No.: 15/274,836

(22) Filed: Sep. 23, 2016

(65) Prior Publication Data

US 2017/0201380 A1    Jul. 13, 2017

Related U.S. Application Data

(60) Provisional application No. 62/276,933, filed on Jan. 10, 2016.

(51) Int. Cl.
*H04L 29/06* (2006.01)
*H04L 9/32* (2006.01)
(Continued)

(52) U.S. Cl.
CPC ............ *H04L 9/3252* (2013.01); *G06F 8/654* (2018.02); *H04L 9/0643* (2013.01);
(Continued)

(58) Field of Classification Search
None
See application file for complete search history.

(56) References Cited

U.S. PATENT DOCUMENTS

2009/0222910 A1    9/2009   Le Bihan et al.
2012/0054493 A1*   3/2012   Bradley ............... H04W 8/005
                                                              713/171
(Continued)

FOREIGN PATENT DOCUMENTS

WO      2004/100487      11/2004

OTHER PUBLICATIONS

International Search Report and Written Opinion in PCT Application No. PCT/US2016/067007 dated Feb. 15, 2017, 12 pages.
Written Opinion of the International Preliminary Examining Authority in PCT Application No. PCT/US2016/067007 dated Dec. 12, 2017, 7 pages.
(Continued)

*Primary Examiner* — Andrew J Steinle
(74) *Attorney, Agent, or Firm* — Meyertons, Hood, Kivlin, Kowert & Goetzel, P.C.

(57) ABSTRACT

Techniques are disclosed relating to the secure communication of devices. In one embodiment, a first device is configured to perform a pairing operation with a second device to establish a secure communication link between the first device and the second device. The pairing operation includes receiving firmware from the second device to be executed by the first device during communication over the secure communication link, and in response to a successful verification of the firmware, establishing a shared encryption key to be used by the first and second devices during the communication. In some embodiments, the pairing operation includes receiving a digital signature created from a hash value of the firmware and a public key of the second device, and verifying the firmware by extracting the hash value from the digital signature and comparing the extracted hash value with a hash value of the received firmware.

20 Claims, 6 Drawing Sheets

(51) Int. Cl.
*H04L 9/06* (2006.01)
*H04L 9/08* (2006.01)
*H04L 9/14* (2006.01)
*H04L 9/30* (2006.01)
*H04W 12/04* (2009.01)
*H04W 12/06* (2009.01)
*H04W 76/14* (2018.01)
*G06F 8/654* (2018.01)
*H04L 29/08* (2006.01)
*H04W 4/80* (2018.01)

(52) U.S. Cl.
CPC .............. *H04L 9/0866* (2013.01); *H04L 9/14* (2013.01); *H04L 9/3066* (2013.01); *H04L 63/061* (2013.01); *H04L 63/083* (2013.01); *H04L 63/0861* (2013.01); *H04L 63/0869* (2013.01); *H04W 12/04* (2013.01); *H04W 12/06* (2013.01); *H04W 76/14* (2018.02); *H04L 67/34* (2013.01); *H04L 2209/80* (2013.01); *H04W 4/80* (2018.02)

(56) References Cited

U.S. PATENT DOCUMENTS

| | | | |
|---|---|---|---|
| 2014/0068744 | A1* | 3/2014 | Bran .................... H04W 12/04 726/9 |
| 2014/0223174 | A1 | 8/2014 | Krishnamurthy et al. |
| 2014/0282882 | A1 | 9/2014 | Tsui et al. |
| 2015/0074420 | A1* | 3/2015 | Sone ....................... G06F 8/654 713/187 |
| 2015/0189006 | A1* | 7/2015 | Smus .................... H04L 67/104 709/204 |
| 2015/0261521 | A1 | 9/2015 | Choi et al. |
| 2015/0358169 | A1* | 12/2015 | Krishnamurthy ... H04L 63/0823 713/175 |
| 2016/0048684 | A1* | 2/2016 | Kocher ................. G06F 21/602 713/2 |

OTHER PUBLICATIONS

International Preliminary Report in PCT Application No. PCT/US2016/067007 dated Apr. 12, 2018, 8 pages.

* cited by examiner

SECURE DEVICE PAIRING

This application claims the benefit of U.S. Prov. Appl. No. 62/276,933 filed on Jan. 10, 2016, which is incorporated by reference herein in its entirety.

BACKGROUND

Technical Field

This disclosure relates generally to computer systems, and, more specifically, to secure communication between computing devices.

Description of the Related Art

Various protocols have been developed to enable short-range communication between devices. In some instances, protocols, such as Bluetooth™, may require a user to pair two devices before they can communicate with one another. This may include a user enabling both devices to discover one another and entering a code displayed on one device into the other device. If the displayed code matches the entered code, the devices may complete the pairing process and begin communicating with one another. Under this communication paradigm, the code entered by the user is employed to authenticate one device with the other.

SUMMARY

The present disclosure describes embodiments in which a pairing operation is performed between two devices in order to establish a secure communication link between the devices. In various embodiments, the pairing operation includes a first of the devices providing firmware to a second of the device that executes the firmware when it communicates over the secure link. In such an embodiment, the second device may verify the firmware before it establishes a shared key used to communicate with the first device. In some embodiments, the pairing operation also includes a trusted entity providing signed data to the first device, which conveys the signed data to the second device. In such an embodiment, the signed data cryptographically binds a hash value of the firmware to an identifier of the first device (e.g., a public key of the first device). In some embodiments, upon verifying the signed data, the second device derives the shared key using the identifier in the signed data.

Figure 1:
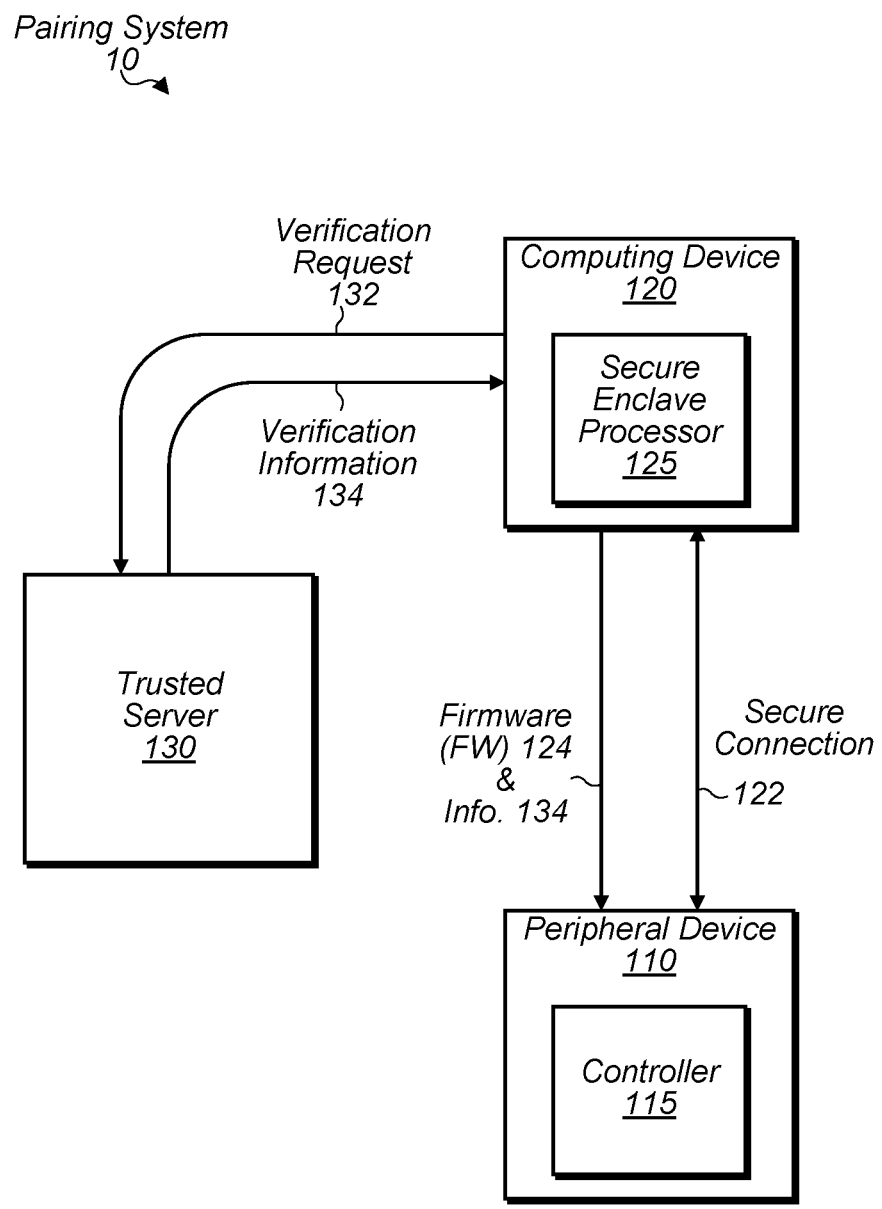
FIG. 1 is a block diagram illustrating one embodiment of system for pairing two computing devices.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "secure circuit configured to perform a cryptographic operation" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. Thus, the "configured to" construct is not used herein to refer to a software entity such as an application programming interface (API).

The term "configured to" is not intended to mean "configurable to." An unprogrammed FPGA, for example, would not be considered to be "configured to" perform some specific function, although it may be "configurable to" perform that function and may be "configured to" perform the function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, in a processor having eight processing cores, the terms "first" and "second" processing cores can be used to refer to any two of the eight processing cores. In other words, the "first" and "second" processing cores are not limited to logical processing cores 0 and 1, for example.

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

DETAILED DESCRIPTION

The present disclosure describes embodiments in which devices are paired with one another in order to enable communication between devices. As used herein, the term "pairing" is to be interpreted according to its understood meaning in the art, and includes a process that establishes a communication link between two devices. As will be described below, in various embodiments, a pairing operation may be performed between two devices that rely on a trusted, separate computing system to verify the identities of one or both devices. If the trusted computing system is able to successfully verify the identities, the system may indicate this to both devices, which may proceed to complete the pairing operation including the exchange of a shared key for secure communication over an established communication link. On the other hand, if the trusted computing system is unable to successfully verify the identities, the pairing operation may be discontinued before a communication link is established. In some instances, relying on a trusted computing system to authenticate devices may be more secure than placing trust in a user attempting to pair devices—particularly if the user has malicious intentions.

In various embodiments discussed below, the pairing operation may also include the communication of firmware from one device to another, where the firmware is to be executed by the receiving device during communication over the secure link established in the pairing operation. In such an embodiment, the trusted computing system may provide information (e.g., signed data) attesting to the validity of the firmware. In some embodiments, the receiving device may verify the received firmware against this provided information before exchanging a shared key in the pairing operation and executing the firmware. In some instances, verifying firmware in this manner may provide additional security by reducing the risk that the device receiving the firmware may become compromised due to flawed firmware.

Turning now to FIG. 1, a block diagram of a system 10 for pairing devices is depicted. In the illustrated embodiment, system 10 includes a peripheral device 110, computing device 120, and a trusted server 130. As shown, peripheral device 110 may include a controller 115, and computing device 120 may include a secure enclave processor (SEP) 125. In some embodiments, system 10 may be implemented differently than shown.

Peripheral device 110, in one embodiment, is a device configured to perform input and/or output operations for computing device 120. For example, in one embodiment, device 110 includes a keyboard configured to receive key presses from a user and convey that information to computing device 120. In another embodiment, device 110 includes a touch screen configured to display frames generated by computing device 120 as well as receive user touch inputs. In some embodiments, device 110 may also include a biosensor configured to collect user biometric data such as discussed below with respect to FIG. 2. In various embodiments, device 110 is configured to be decoupled from device 120. That is, device 110 may initially pair with one device 120 and then subsequent pair with another device 120. In some embodiments, device 110 may also be configured to be paired (i.e., communicate over established links) with multiple devices in parallel. In some embodiments, device 110 is configured to couple to device 120 via a wired interconnect such as a universal serial bus (USB). In other embodiments, device 110 is configured to couple to device 120 via a wireless interconnect such as one supporting Bluetooth™.

Computing device 120, in one embodiment, is a computing device configured to use the input/output (I/O) functionality of device 110. Accordingly, in one embodiment in which device 110 includes a keyboard, device 120 may be configured to perform various operations in response to keys being pressed on the keyboard. In some embodiments in which device 110 includes a biosensor, device 120 may be configured to authenticate a user by comparing received biometric data with previously stored biometric data from a user. Device 120 may be any suitable computing device such as desktop computer, laptop computer, mobile device (e.g., mobile phone, tablet, etc.), server computer, etc.

In various embodiments, devices 110 and 120 are configured to perform a pairing operation that establishes a secure connection 122 between them. Accordingly, in such embodiment, the pairing operation may include the negotiation of a cryptographic algorithm to be used (e.g., whether to use 128-bit, 192-bit, or 256-bit advance encryption standard (AES)) and the establishment of corresponding encryption keys to be used. In various embodiments, the pairing operation includes performance of a key exchange, such as a Diffie-Hellman (DH) key exchange, in order to establish a shared secret (e.g., an encryption key) used to encrypt and decrypt information communicated over connection 122. In some embodiments, devices 110 and 120 are configured to perform an elliptic curve DH (ECDH) exchange in which a shared key is established based on public-key pairs used by devices 110 and 120. That is, device 110 may determine the shared key based on a locally stored private key and a public key received from device 120. Similarly, device 120 may determine the shared key based a locally stored private key corresponding to the public key sent to device 110 and a public key that is received from device 120 corresponding to device 120's private key. In some embodiments, cryptographic operations performed by device 120 (including the encryption and decryption of information sent over connection 122) is performed by SEP 115 shown in FIG. 1. As discussed below with respect to FIG. 3, in some embodiments, SEP 125 is a dedicated secure circuit configured to securely store encryption keys used by device 120 and includes circuitry for performing cryptographic operations using those keys. (As used herein, the term "secure circuit" refers to a circuit that protects an isolated, internal resource from being directly accessed by an external circuit.) As discussed below, this pairing operation may rely on trusted server 130 to authenticate devices 110 and 120 before permitting connection 122 to be established.

In some embodiments, peripheral device 110 is also configured to receive firmware (FW) 124 as part of the pairing operation performed by devices 110 and 120. In some embodiments, firmware 124 is received from trusted server 130 via device 120 or received directly from device 120. In various embodiments, this firmware 124 may be executed by controller 115 to implement various functionality described with respect to device 110 during a portion of pairing operation and/or during communication over connection 122. Accordingly, in some embodiments, firmware 124 may be executable to implement the encryption and decryption of information transmitted over connection 122. In some embodiments, receiving firmware 124 during the paring operation allows device 110 to execute different versions of firmware 124 as selected by computing devices 120. That is, device 110 may execute a first version of firmware 124 after pairing with a first computing device 120 and then later execute a second, different version of the firmware 124 after pairing with a second computing device 120. In some embodiments, device 110 is configured verify the integrity of any received firmware 124 prior to performing any key exchange with device 120 and executing the firmware. As discussed next, this verification may be based on information provided by trusted server 130.

Trusted server 130, in one embodiment, is a computer system that is trusted by devices 110 and 120 and configured to verify the identities of devices 110 and 120. In the illustrated embodiment, server 130 is configured to receive a verification request 132 and provide verification information 134 indicative of the results of these verifications. Although shown as a single server, in some embodiments, server 130 may be one of multiple servers that implement a computer cluster (i.e., cloud) configured to implement functionality described herein with respect to server 130. In various embodiments, server 130 maintains a list of authorized devices that are permitted to pair with one another. In such an embodiment, this list may include authentication information that is able to uniquely identify a given device 110 or 120. In some embodiments, this authentication information may include a device's serial number (or some other value that identifies a device), which may be stored in the device during fabrication of the device. In some embodiments, this authentication information also includes a public key certificate for each device 110 and 120, where each certificate includes the public key used by that device. In such an embodiment, the corresponding private key may be stored in the device during fabrication and is usable to authenticate the device by generating a digital signature verifiable using the public key stored on server 130. In various embodiments, server 130 is configured to also revoke devices 110 and 120 as warranted by removing them from this list (or adding them to a blacklist in some embodiments).

In various embodiments, trusted server 130 is also configured to include information in verification information 134 that is usable by device 110 to verify firmware 124. In some embodiments, server 130 may maintain a list of acceptable versions of firmware 124. If the version of firmware 124 to be used by device 110 is acceptable for execution, in some embodiments, server 130 may include a hash value of firmware 124 in verification information 134—the hash value being generated by applying a hash function to firmware 124, such as a hash function in accordance with a secure hash algorithm (SHA). Upon receiving this hash value, device 110 may compare this hash value with one that it generates from the received firmware 124 in order to verify the received firmware 124. In some embodiments, information 134 may also include a value (called an "epoch" as discussed below with FIG. 2) that identifies the lowest version of firmware 124 that is acceptable to be executed by device 110. Accordingly, in verifying firmware 124, device 110 may also verify that the version of the received firmware 124 is in accordance with (e.g., greater than or equal to) the epoch specified in information 134. In some instances, if a particular version of firmware is determined to be problematic, server 130 may update the epoch so that it identifies a newer version of firmware 124—and thus, revokes any older problematic versions in order to prevent them from being executed.

In various embodiments, trusted server 130 is configured to generate verification information 134 that cryptographically binds the identities of one or both of devices 110 and 120 to the particular firmware 124 to be executed by device 110. As discussed below with respect to FIG. 4A, in various embodiments, devices 110 and 120 may perform an initial pairing operation that begins with computing device 120 collecting authentication information from peripheral device 110 and conveying that information along with authentication information for device 120 to server 130 in a request 132. The request 132 may also include a hash value of the firmware 124 to be provided to device 110. In response to a successful verification of this authentication information and the hash value, server 130 may produce verification information 134 by generating signed data (i.e., one or more digital signatures) from all or a portion of the received authentication information and the received hash value. Devices 110 and/or 120 may then verify the signed data using the public key identified in the server's public-key certificate. This verification may also include extracting the signed hash value and using it to verify firmware 124. If verification of the signed data fails (or server 130 is not able to successfully verify the authentication information or the hash value), devices 110 and 120 may be configured to discontinue the pairing operation. In some embodiments, discontinuing of the paring operation may occur prior to performance of any key exchange as the signed authentication information may be used to establish a shared key between devices 110 and 120 as discussed below with FIG. 4A. If the verification is successful, device 110 may begin executing the received firmware 124, and the pairing operation may proceed to completion.

Upon completion of a successful pairing operation, in various embodiments, peripheral device 110 is configured to generate a token usable expedite subsequent pairing operations. As discussed below with respect to FIGS. 2 and 4B, in various embodiments, device 110 is configured to use a keyed hash function to generate a token, which is provided to device 120. When device 120 later attempts to perform a pairing operation with device 110, device 120 may provide the previously generated token (as opposed to obtaining verification information 134 from server 130). Device 110 may then verify the provided token and proceed to complete the pairing operation with device 120. If, however, device 110 is unable to verify the token, device 110 may instruct device 120 to fall back to performance of the initial pairing operation before pairing can be successfully completed. In some embodiments, usage of tokens may permit a device 110 to not maintain state about previous pairings, which can result in significant memory savings when pairing with multiple devices and having limited non-volatile memory. That is, rather than storing a record for each pairing with device 120, device 110 can rely on the token to determine that pairing was previously authorized by server 130. (In other embodiments, however, device 110 may store state information from previous pairing operations instead of using tokens.) In some embodiments, usage of tokens may also permit pairing when communication with server 130 is not presently feasible—e.g., when devices 110 and 120 are on a plane without Internet access.

Figure 2:
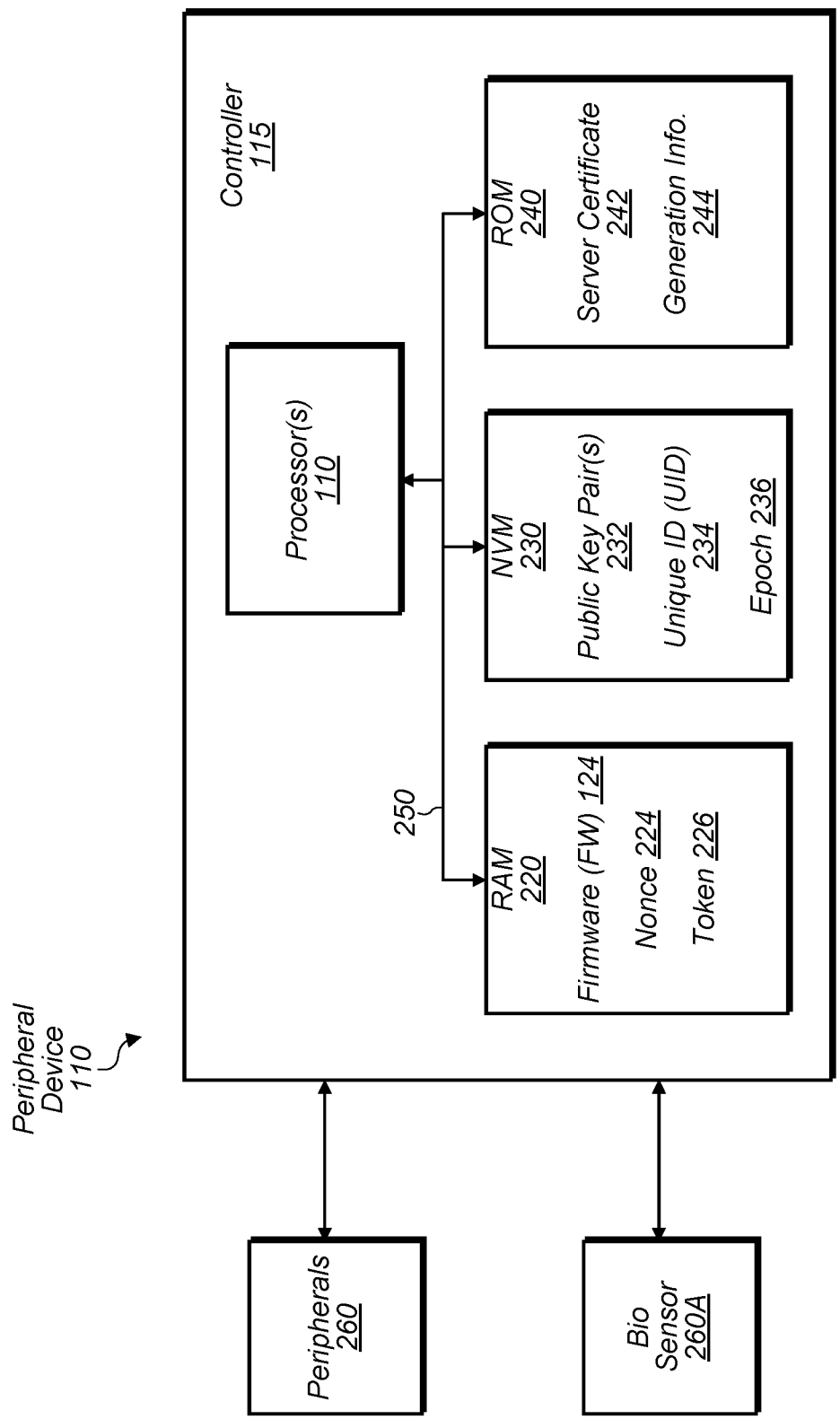
FIG. 2 is a block diagram illustrating one embodiment of a peripheral device to be paired with a computing device.

Turning now to FIG. 2, a block diagram of peripheral device 110 is depicted. In the illustrated embodiment, device 110 includes controller 115, which includes one or more processors 210, random access memory (RAM) 220, non-volatile memory (NVM) 230, and read only memory (ROM) 240. As shown, peripheral device 110 also includes one or more I/O interfaces 260 including a biosensor 260A. In the illustrated embodiment, RAM 220 includes firmware 124, nonce 224, and token 226. NVM 230 includes one or more public-key pairs 232, a unique ID (UID) 234, and epoch 236. ROM 240 includes a server certificate 242 and generation information 244. In some embodiments, peripheral device 110 may be implemented differently than shown. For example, elements 222-244 may be arranged differently among memories 220, 230, and 240.

As noted above, firmware 124, in one embodiment, is received from device 120 and is executable to cause peripheral device 110 to perform functionality described herein. In the illustrated embodiment, firmware 124 is stored in a computer readable medium (i.e., RAM 220) and is executable by one or more of processors 210. In some embodiments, firmware 124 may be stored different than shown. In some embodiments, processors 210 may implement functionality described with respect to CPU 320 below with FIG. 3; memories 220-240 may also implement functionality described with respect to memory 330.

Nonce 224, in one embodiment, is a numeric value that is generated by device 110 and included in the signed data provided by server 130 as discussed below with respect to FIG. 4A. As used herein, the term "nonce" is to be interpreted according to its understood meaning in the art, and includes an arbitrary number that is only used once in a cryptographic operation. The inclusion of nonce 224 may prevent device 120 from providing an older version of signed data from server 130, which may no longer be valid.

Figure 4A:
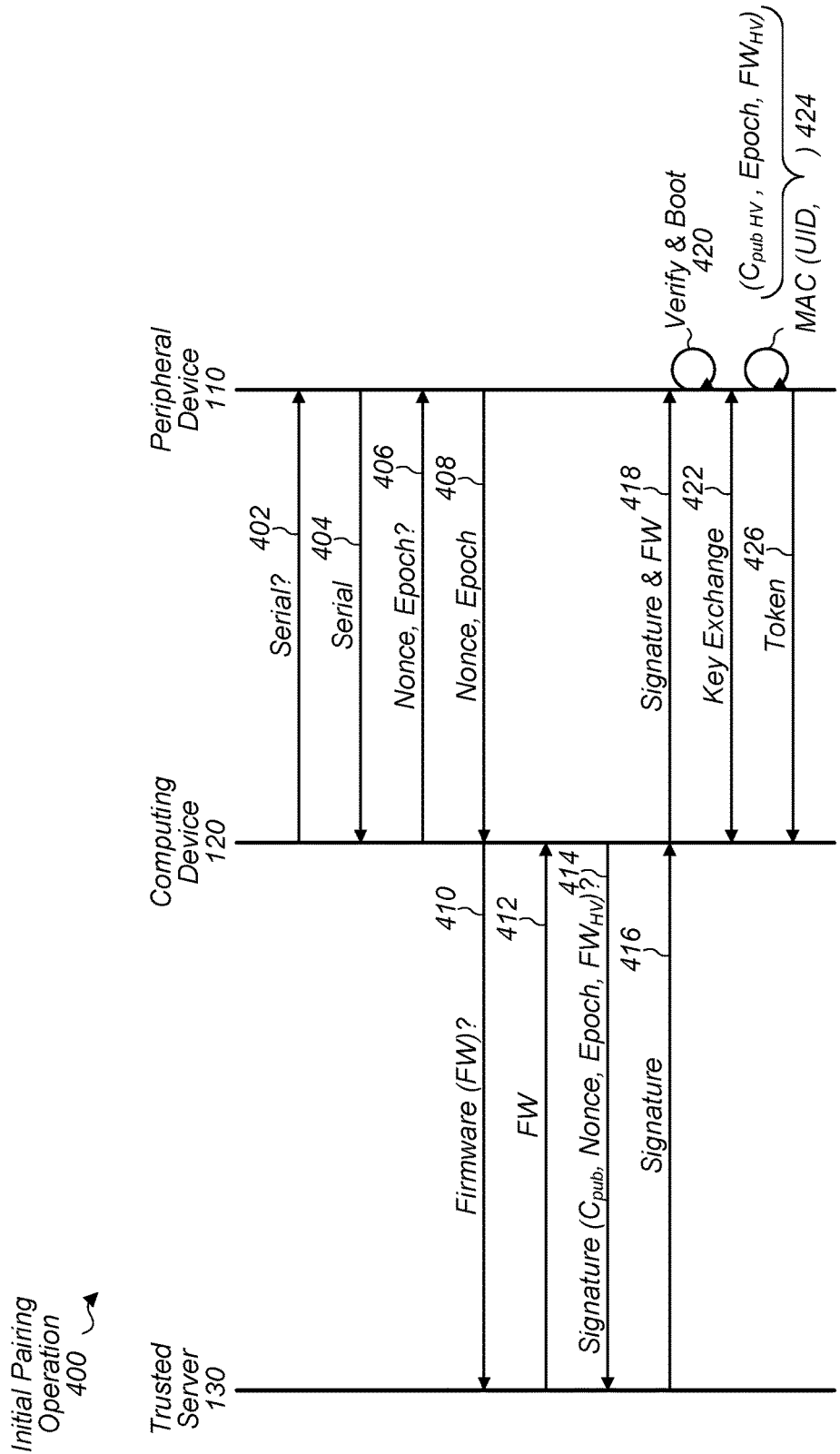
FIGS. 4A and 4B are communication diagrams illustrating embodiments of pairing operations.
Figure 4B:
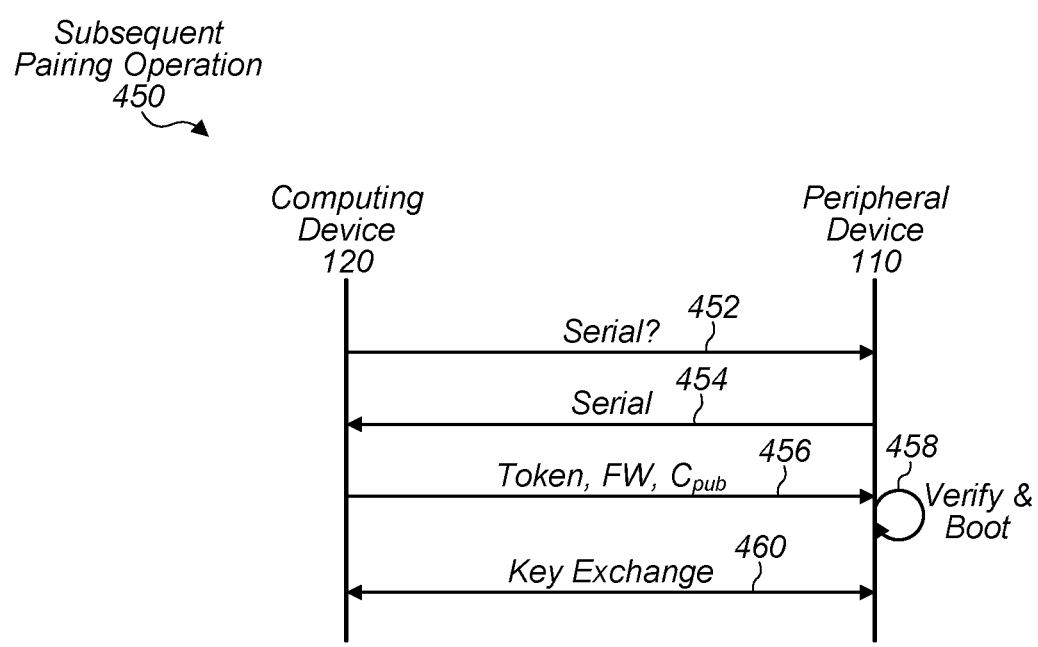

Token 226, in one embodiment, is a value that is generated by device 110 and provided to device 120 in order to facilitate subsequent pairing operations as discussed with respect to FIG. 4B. As noted above, token 226 may be generated using a keyed hash function. Accordingly, in one embodiment, token 226 is a hash-based message authentication code (HMAC) generated from device 120's public key, epoch 236, and a hash value of firmware 124. In such an embodiment, device 110 may use UID 234 as the key for the HMAC. As noted above, use of a token 226 may allow device 110 to not maintain state about a previous pairing. Rather, upon receiving a token 226, device 110 may extract previously used information such as device 120's public key, epoch 236, and the hash value of firmware 124.

Public key pairs 232, in one embodiment, are public and private keys used by device 110 to communicate with other devices such as computing device 120. In some embodiments, a given pair 232 is used to establish a shared key with device 120 using an ECDH key exchange. In some embodiments, keys of pairs 232 are ephemeral keys—i.e., keys that are only used for a short amount of time, before being replaced.

Unique identifier (UID) 234, in one embodiment, is a private key stored in device 110 during fabrication. In various embodiments, device 110 uses UID 234 to generate digital signatures for authenticating with trusted server 130. In some embodiments, UID 234 is a longer term key used to sign ephemeral keys 232 in order to establish that they belong to device 110.

Epoch 236, in one embodiment, is a stored value that indicates the minimum version of firmware 124 that device 110 is permitted to execute. In some embodiments, epoch 236 may be stored during fabrication, but may be periodically updated by trusted server 130 when particular versions of firmware 124 have been revoked due to various issues (e.g., identified security vulnerabilities). In various embodiments, device 110 is configured to compare epoch 236 with the version of received firmware 124 in order to ensure that firmware 124 is at least this minimum version.

Server certificate 242, in one embodiment, is a digital certificate for trusted server 130 and includes the public key usable to verify any signed data generated with server 130's corresponding private key. Accordingly, certificate 242 may be used to verify the integrity of verification information 134 and extract data from information 134. In some embodiments, certificate 242 is stored in device 110 during fabrication of device 110.

Generation information 244, in one embodiment, is information describing device 110. In some embodiments, information 244 may include a serial number, make and model information, etc. In some embodiments, information 244 may be used to authenticate device 110 and select the appropriate firmware 124 for device 110.

I/O interfaces 260, in one embodiment, are interface devices configured to collect user inputs and/or provide information to a user. In various embodiments, information input into interfaces 260 and output by interfaces 260 may be communicated securely over secure connection 122. As noted above, SEP 125 may perform encryption and decryption of this information at device 120. Interfaces 260 may include any suitable devices including, in some embodiments, a keyboard, a touch screen, a microphone, biosensor 260A, any of peripherals 340 discussed below, etc.

Biosensor 260A, in one embodiment, is configured to detect biometric data for a user of peripheral device 110. Biometric data may be data that uniquely identifies the user among other humans (at least to a high degree of accuracy) based on the user's physical or behavioral characteristics. For example, in some embodiments, sensor 260A is a finger print sensor that captures fingerprint data from the user. In some embodiments, SEP 125 is configured to maintain previously captured fingerprint data of an authorized user and compare it against newly received fingerprint data from sensor 260A in order to authenticate a user. (In another embodiment, biosensor 260A may perform the comparison.) If the fingerprint data matches, SEP 125 may permit performance of a requested service—e.g., logging into computing device 120. In some embodiments, communications between SEP 125 and biosensor 260A may be encrypted over connection 122 such that another entity is unable to view communicated fingerprint data. In some embodiments, other types of biometric data may be captured by sensor 260A such as voice recognition (identifying the particular user's voice), iris scanning, etc.

Figure 3:
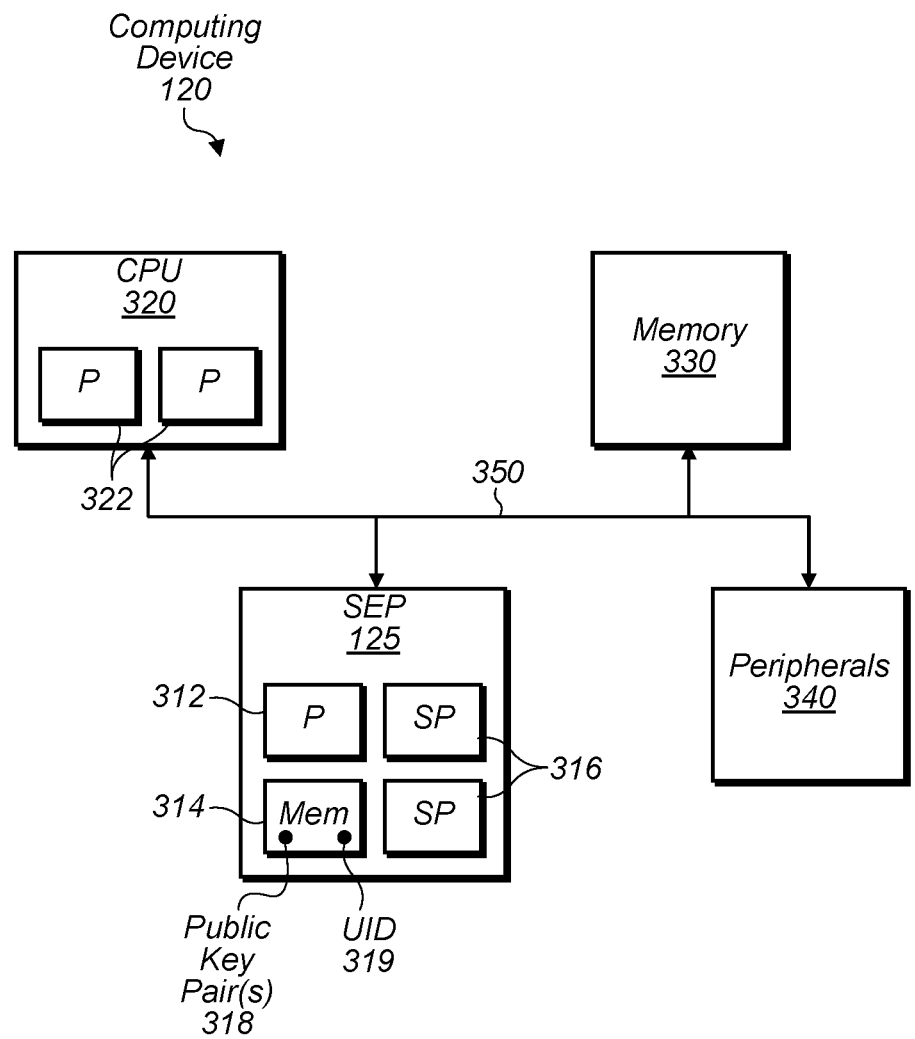
FIG. 3 is a block diagram illustrating one embodiment of a computing device.

Turning now to FIG. 3, a block diagram of computing device 120 is depicted. In the illustrated embodiments, computing device 120 includes CPU 320, SEP 125, memory 330, peripherals 340 coupled via a communication fabric 350. As shown, CPU 320 may include one or more processors P 322. In the illustrated embodiment, SEP 125 includes one or more processors P 312, a secure memory 314, and one or more security peripherals 316. SEP 114 may, however, include any desired circuitry (e.g. cryptographic hardware, hardware that accelerates certain operations that are used in cryptographic functions, etc.). Accordingly, although depicted with a processor 312, in other embodiments, a processor may not be included.

As noted above, SEP 125 is a secure circuit configured to perform various cryptographic operations in various embodiments. In various embodiments, SEP 125 may be isolated from the rest of the computing device 120 except for a carefully controlled interface (thus forming a secure enclave for SEP processor 312, secure memory 314, and security peripherals 316). Because the interface to SEP 125 is carefully controlled, direct access to SEP processor 312, secure memory 314, and security peripherals 316 may be prevented. In one embodiment, a secure mailbox mechanism may be implemented. In the secure mailbox mechanism, external devices may transmit messages to an inbox. SEP processor 312 may read and interpret the message, determining the actions to take in response to the message. Response messages from the SEP processor 312 may be transmitted through an outbox, which is also part of the secure mailbox mechanism. Other interfaces that permit only the passing of commands/requests from the external components and results to the external components may be used. No other access from the external devices to SEP 125 may be permitted, and thus the SEP 125 may be "protected from access". More particularly, software executed anywhere outside SEP 125 may be prevented from direct access to the secure components with the SEP 125. SEP processor 312 may determine whether a command is to be performed. In some cases, the determination of whether or not to perform the command may be affected by the source of the command. That is, a command may be permitted from one source but not from another.

In some embodiments, SEP processor 312 may execute securely loaded software that facilitates implementing functionality descried with respect to SEP 125. For example, a secure memory 314 may include software executable by SEP processor 312. One or more of the security peripherals 316 may have an external interface, which may be connected to a source of software (e.g. a non-volatile memory such as Flash memory). In another embodiment, the source of software may be a non-volatile memory coupled to another peripheral 316, and the software may be encrypted to avoid observation by a third party. The software from the source may be authenticated or otherwise verified as secure, and may be executable by SEP processor 312. In some embodiments, software may be loaded into a trust zone in memory 330 that is assigned to the SEP 125, and SEP processor 312 may fetch the software from the trust zone for execution. The software may be stored in the memory 330 in encrypted form to avoid observation. Despite the steps taken to ensure security of the secure software, the secure software may still be prevented from directly accessing/obtaining stored private keys. Only hardware may have access to private keys, in an embodiment.

In the illustrated embodiment, secure memory 314 also includes one or more public key pairs 318 and a unique identifier (UID) 319. Similar to pairs 232 discussed above, pairs 318 are public and private keys used by device 120 to communicate with other devices such as device 110. In some embodiments, a given pair 318 is used (with a pair 232) to establish a shared key with device 120 using an ECDH key exchange. In some embodiments, keys of pairs 318 are ephemeral keys. In one embodiment discussed below with respect to FIG. 4A, the public key to be used in a ECDH key exchanged is included in the signed data provided in information 134. Similar to UID 234, UID 319, in one embodiment, is a private key stored in device 120 during fabrication. In various embodiments, device 120 uses UID 319 to generate digital signatures for authenticating with trusted server 130. In some embodiments, UID 319 is a longer term key used to sign ephemeral keys in pairs 318 in order to establish that they belong to device 120.

Security peripherals 316 may be hardware configured to assist in the secure services performed by SEP 125. Accordingly, security peripherals 316 may include authentication hardware implementing/accelerating various authentication algorithms, encryption hardware configured to perform/accelerate encryption, secure interface controllers configured to communicate over a secure interface to an external (to computing device 120) device, etc.

As mentioned above, CPU 320 may include one or more processors 322. Generally, a processor may include circuitry configured to execute instructions defined in an instruction set architecture implemented by the processor. Processors 322 may include (or correspond to) processor cores implemented on an integrated circuit with other components as a system on a chip (SOC) or other levels of integration. Processors 322 may further include discrete microprocessors, processor cores and/or microprocessors integrated into multichip module implementations, processors implemented as multiple integrated circuits, etc.

Processors 322 may execute the main control software of the system, such as an operating system. Generally, software executed by CPU 320 during use may control the other components of the system to realize the desired functionality of the system. The processors may also execute other software. These applications may provide user functionality, and may rely on the operating system for lower-level device control, scheduling, memory management, etc. Accordingly, processors 322 (or CPU 320) may also be referred to as application processors. CPU 320 may further include other hardware such as an L2 cache and/or an interface to the other components of the system (e.g. an interface to the communication fabric 350).

Memory 330 may generally include the circuitry for storing data. For example, memory 330 may be static random access memory (SRAM), dynamic RAM (DRAM) such as synchronous DRAM (SDRAM) including double data rate (DDR, DDR2, DDR3, DDR4, etc.) DRAM. Low power/mobile versions of the DDR DRAM may be supported (e.g. LPDDR, mDDR, etc.). Device 120 may include a memory controller (not shown) that may include queues for memory operations, for ordering (and potentially reordering) the operations and presenting the operations to the memory 330. The memory controller may further include data buffers to store write data awaiting write to memory and read data awaiting return to the source of the memory operation. In some embodiments, the memory controller may include a memory cache to store recently accessed memory data. In some embodiments memory 330 may include program instructions that are executable by one or more processors 322 to cause device 120 to perform various functionality described herein with respect to device 120.

Peripherals 340 may be any set of additional hardware functionality included in device 120. For example, peripherals 340 may include video peripherals such as an image signal processor configured to process image capture data from a camera or other image sensor, display controllers configured to display video data on one or more display devices, graphics processing units (GPUs), video encoder/decoders, scalers, rotators, blenders, etc. Peripherals 340 may include audio peripherals such as microphones, speakers, interfaces to microphones and speakers, audio processors, digital signal processors, mixers, etc. Peripherals 340 may include interface controllers for various interfaces including interfaces such as Universal Serial Bus (USB), peripheral component interconnect (PCI) including PCI Express (PCIe), serial and parallel ports, etc. Peripherals 340 may include networking peripherals such as media access controllers (MACs). Any set of hardware may be included.

Communication fabric 350 may be any communication interconnect and protocol for communicating among the components of device 120. Communication fabric 350 may be bus-based, including shared bus configurations, cross bar configurations, and hierarchical buses with bridges. Communication fabric 350 may also be packet-based, and may be hierarchical with bridges, cross bar, point-to-point, or other interconnects.

Turning now to FIG. 4A, a communication diagram of an initial pairing operation 400 is depicted. In various embodiments, initial pairing operation 400 may be performed by elements 110-130 when devices 110 and 120 have not been paired previously or are unable to successfully perform pairing operation 450.

In the illustrated embodiment, pairing operation 400 begins with computing device 120 sending a request at 402 to peripheral device 110 for its serial number and receiving a corresponding response at 404. Device 120 may also send a request at 406 for a nonce 224 and an epoch 236, which may be provided in a response from device 110 at 408. In some embodiments, device 110 may sign the serial number, nonce, and/or epoch with UID 234. In some embodiments, different information may be collected by device 120 than what is shown in FIG. 4A.

Based on the received serial number and the epoch 236, device 120 may determine whether it currently stores a suitable version of firmware 124 for device 110. If it does not include the appropriate version of firmware 124, in some embodiments, device 120 may issue a request for firmware 124 at 410, which may be provided in a response at 412. Once device 120 receives firmware 124 or determines to use a locally stored copy, device 120 may generate a hash value of the firmware 124 shown as $FW_{HV}$.

In the illustrated embodiment, computing device 120 then sends a verification request 132 at 414 asking for a signature of device 120's public key $C_{pub}$ (corresponding to a public key from a pair 318), the nonce, the received epoch 236, and the generated hash value. In some embodiments, this request 132 may also include additional information for signing such as the serial number, a public key of device 110, etc.; the request 132 may also be signed using UID 319. Trusted server 130 may then verify the information in request 132 by using the maintained list discussed above with respect to FIG. 1. In response to a successful verification, trusted server 130 may provide a verification information 134 at 416 in FIG. 1 that includes a digital signature generated from the information included in request 132.

Once the digital signature is received, computing device 120 may provide the signature and firmware at 418 to device 110. Peripheral device 110 may then confirm the validity of the signature by using certificate 242. Device 110 may also extract the signed hash value from the signature and compare the extracted hash value with one generated from the received firmware 124 in order to ensure the firmware 124 is valid. In some embodiments, device 110 may update its stored epoch 236 with the signed epoch in the signature, and confirm that the received firmware is in compliance with the stored epoch 236. If device 110 is able to successfully verify the signature and firmware, device 110 may perform a boot of the firmware 124 at 420.

After the new firmware 124 is booted, peripheral device 110 may perform a key exchange at 422 in order to establish a shared key to be used in exchanging encrypted information over connection 122. As discussed above, this exchange may be employed using ECDH. In such an embodiment, device 110 may determine the shared key using the signed public key $C_{pub}$ in the received digital signature. Device 110 may also provide its public key (corresponding to a key in a pair 232), so that device 120 is able to also derive the shared key.

Upon successfully completing the key exchange, device 110 may lastly generate a token 226 at 424. In the illustrated embodiment, device 110 uses its UID 234 as a key to generate a message authentication code (MAC) from a hash value of Cpub (shown as $C_{pub\ HV}$), the current epoch 236, a hash value of the received firmware 124. (In some embodiments in which a token is not generated, device 110 may merely store this information, so that it can use it during a subsequent pairing operation.) At 426, device 110 provides the token to device 120, so that the token can be used to expedite a subsequent pairing operation as discussed next.

Turning now to FIG. 4B, a communication diagram of a subsequent pairing operation 450 is depicted. In various embodiments, subsequent pairing operation 450 is performed by devices 110 and 120 once initial pairing operation 400 has been successfully completed.

In the illustrated embodiment, operation 450 beings with device 120 querying device 110 for its serial number at 452. Upon receiving the serial number at 454, computing device 120 may determine whether it stores any tokens 226 associated with the serial number. If it does, device 120 sends the token 226, firmware 124, and its public key $C_{pub}$ at 456.

Upon receiving the token, device 110 may verify the token 226 and use the token to verify firmware 124. In some embodiments, verifying the token may include device 110 recalculating the token 226 from the received information in a similar manner as at 424 and comparing the received token 226 with the recalculated token 226 in order to ensure that they match. In doing so, device 110 is also verifying 1) that device 120 is the same device it communicated with when the token was generated and 2) that same firmware 124 executed previously is about to be executed. If the tokens do not match, however, the received firmware 124, public key Cpub, and/or epoch 236 may have changed. As a result, device 110 may instruct device 120 to fall back to performing initial pairing operation 400. If, however, the verification is successful, device 110 may again boot the firmware 124. At which point, device 110 may perform a key exchange 460 with device 120 in a similar manner as key exchange 422 discussed above.

Figure 5:
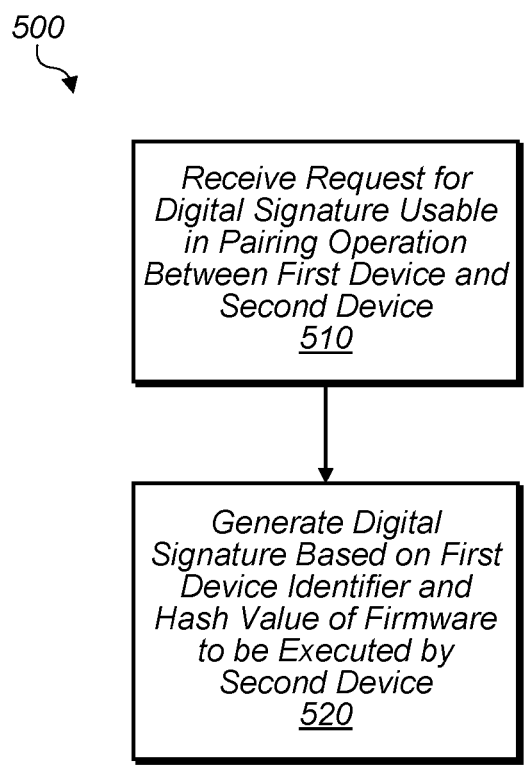
FIG. 5 is a flow diagram illustrating one embodiment of a method associated with a pairing operation.

Turning now to FIG. 5, a flow diagram of method 500 is depicted. Method 500 is one embodiment of a method that may be performed by a computer system such as trusted server 130. In some instances, performing method 500 may allow a more secure paring operation to be performed for the reasons noted above.

In step 510, a computer system receives, from a first device (e.g., computing device 120), a request for a digital signature (e.g., request 132) usable in a pairing operation between the first device to a second device (e.g., peripheral device 110). In some embodiments, the computer system storing a list indicative of devices permitted to pair with the second device and determines whether the first device is specified in the list prior to proceeding to step 520.

In step 520, the computer system generates the requested digital signature (e.g., verification information 134) based on an identifier of first device (e.g., a public key in a pair 318) and a hash value of firmware (e.g., firmware 124) to be executed by the second device. In some embodiments, the computer system provides an epoch value (e.g., epoch 236) to the second device, where the epoch value indicates a minimum version of firmware permitted to be executed by the second device. Providing the epoch value causes the second device to discontinue using the firmware associated with the digital signature. In some embodiments, step 520 also includes the computer system providing the firmware to first device, which conveys the firmware to the second device during the pairing operation.

In various embodiments, method 500 may be repeated during subsequent pairing operations with other devices. Accordingly, a subsequent performance may include the computer system receiving, from a third device, a request for another digital signature usable in a pairing operation between the third device to the second device, and the computer system generating the other requested digital signature based on an identifier of third device and a hash value of firmware to be executed by the second device.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A first device, comprising:
   one or more processors; and
   memory having program instructions stored therein that are executable by the one or more processors to cause the first device to:
      perform a pairing operation with a second device to establish a secure communication link between the first device and the second device, wherein the pairing operation includes:
         receiving firmware from the second device to be executed by the first device during communication over the secure communication link; and
         in response to a successful verification of the firmware, establishing a shared encryption key to be used by the first and second devices during the communication; and
      execute the verified firmware during communication over the secure communication link.

2. The first device of claim 1, wherein the pairing operation includes:
   receiving, from a computer system, a digital signature created from a hash value of the firmware and a public key of the second device; and
   verifying the firmware by extracting the hash value from the digital signature and comparing the extracted hash value with a hash value of the received firmware.

3. The first device of claim 2, wherein the pairing operation includes using the public key to establish the shared encryption key.

4. The first device of claim 1, wherein the program instructions are executable to cause the first device to:
   store a value indicating a minimum version of the firmware that is permissible to be executed by the first device; and
   wherein the pairing operation includes verifying that a version of the received firmware is equal to or greater than the minimum version.

5. The first device of claim 4, wherein the program instructions are executable to cause the first device to:
   receive an updated value indicating another version of the firmware as the minimum version permissible to be executed by the first device; and
   replace the stored value with the updated value.

6. The first device of claim 1, wherein the program instructions are executable to cause the first device to:
   perform a subsequent pairing operation with the second device, wherein the subsequent pairing operation includes:
      receiving firmware from the second device; and
      verifying the firmware received during the pairing operation matches the firmware received during the subsequent pairing operation.

7. The first device of claim 6, wherein the pairing operation includes the first device providing, to the second device, a token generated based on an identity of the second device and a hash value of the firmware received during the pairing operation; and
   wherein the subsequent pairing operation includes:
      receiving the token from the second device; and
      verifying that the hash value associated with the token matches a hash value of the firmware received during the subsequent pairing operation.

8. The first device of claim 6, wherein the pairing operation includes the first device storing a hash value of the firmware received during the pairing operation and an identity of the second device; and
   wherein the subsequent pairing operation includes:
      verifying, based on the stored hash value, that the firmware received during the subsequent pairing is the firmware received during the pairing operation; and
      verifying, based on the stored identity, that the firmware received during the subsequent pairing is from the second device.

9. The first device of claim 1, further comprising:
   a biosensor configured to capture biometric information of a user, wherein the program instructions are executable to cause the first device to communicate the captured biometric information over the secure communication link.

10. The first device of claim 9, further comprising:
    a keyboard configured to capture an input from a user, wherein the program instructions are executable to cause the first device to communicate the captured input over the secure communication link.

11. A first device, comprising:
    one or more processors;
    memory having program instructions stored therein that are executable by the one or more processors to cause the first device to:
       perform a pairing operation with a second device to establish a secure communication link between the first and second devices, wherein the pairing operation includes:
          receiving, from a computer system, signed data that binds an identifier of the first device to firmware to be executed by the second device;
          sending the signed data and the firmware to the second device; and
          in response to a successful verification of the firmware, establishing a shared encryption key to be used by the first and second devices during communication.

12. The first device of claim 11, wherein the pairing operation includes:
    receiving a nonce from the second device; and
    sending a request for the signed data to the computer system, wherein the request specifies the nonce, and wherein the signed data binds the nonce to the identifier of the first device and to the firmware.

13. The first device of claim 11, further comprising:
    a secure circuit configured to:
       store a shared key generated during the pairing operation; and use the stored key to decrypt information received over the secure communication link from the second device.

14. The first device of claim 13, wherein the identifier of the first device is a public key of the first device; and
wherein the secure circuit is configured to:
use a private key corresponding to the public key to generate the shared key via an elliptic curve diffie-hellman (ECDH) protocol.

15. The first device of claim 11, wherein the pairing operation includes:
receiving, from the second device, a token usable to authenticate the first device to the second device during a subsequent pairing operation.

16. A method, comprising:
a computer system receiving, from a first device, a request for a digital signature usable in a pairing operation between the first device and a second device, wherein the pairing operation includes an exchange of firmware to be executed by the second device; and
the computer system generating the requested digital signature based on an identifier of first device and a hash value of the firmware, wherein the pairing operation includes establishing a shared encryption key used by the first and second devices in response to a verification of the firmware based on the digital signature.

17. The method of claim 16, further comprising:
the computer system providing an epoch value to the second device, wherein the epoch value indicates a minimum version of firmware permitted to be executed by the second device, wherein the providing causes the second device to discontinue using the firmware associated with the digital signature.

18. The method of claim 16, further comprising:
the computer system storing a list indicative of devices permitted to pair with the second device; and
the computer system determining whether the first device is specified in the list prior to generating the requested digital signature.

19. The method of claim 16, further comprising:
the computer system receiving, from a third device, a request for another digital signature usable in a pairing operation between the third device to the second device; and
the computer system generating the other requested digital signature based on an identifier of third device and a hash value of firmware to be executed by the second device.

20. The method of claim 16, further comprising:
the computer system providing the firmware to first device, wherein the first device conveys the firmware to the second device during the pairing operation.

* * * * *